United States Patent
Welborn, Jr.

[11] Patent Number: 5,124,418
[45] Date of Patent: Jun. 23, 1992

[54] SUPPORTED POLYMERIZATION CATALYST

[75] Inventor: Howard C. Welborn, Jr., Houston, Tex.

[73] Assignee: Exxon Chemical Patents Inc., Linden, N.J.

[21] Appl. No.: 279,471

[22] Filed: Dec. 2, 1988

Related U.S. Application Data

[60] Continuation of Ser. No. 59,292, Jun. 8, 1987, abandoned, which is a division of Ser. No. 871,962, Jun. 9, 1986, Pat. No. 4,701,432, and a continuation-in-part of Ser. No. 798,763, Nov. 15, 1985, abandoned.

[51] Int. Cl.$^5$ .................. C08F 4/626; C08F 10/02
[52] U.S. Cl. .................. 526/114; 526/116; 526/119; 526/348.6; 526/352
[58] Field of Search .................. 526/114, 116, 119

[56] References Cited

U.S. PATENT DOCUMENTS

| | | | |
|---|---|---|---|
| 3,242,099 | 3/1966 | Manyik et al. | 526/153 |
| 3,745,154 | 7/1973 | Kashiwa et al. | 526/116 |
| 4,333,851 | 6/1982 | Speakman et al. | 526/116 |
| 4,383,939 | 5/1983 | Johnstone | 526/114 |
| 4,397,762 | 8/1983 | Johnstone | 526/114 |
| 4,530,914 | 7/1985 | Ewen et al. | 526/114 |
| 4,542,199 | 9/1985 | Kaminsky et al. | 526/160 |
| 4,554,265 | 11/1985 | Graves | 526/114 |
| 4,562,170 | 12/1985 | Graves | 526/114 |
| 4,564,647 | 1/1986 | Hayashi et al. | 526/129 |

*Primary Examiner*—Edward J. Smith
*Attorney, Agent, or Firm*—Jaimes Sher; Myron B. Kurtzman

[57] ABSTRACT

An olefin polymerization catalyst comprising (a) a supported transition metal containing component comprising the support treated with at least one metallocene and at least one non-metallocene transition metal compound, and a cocatalyst comprising an alumoxane and an organometallic compound of a metal of Groups IA, IIA, IIB, or IIIA of the Periodic Table.

11 Claims, No Drawings

SUPPORTED POLYMERIZATION CATALYST

This application is a continuation of Ser. No. 07/059,292, filed Jun. 8, 1987, abandoned; which is a division of Ser. No. 871,962, filed Jun. 9, 1986, U.S. Pat. No. 4,701,432, issued Oct. 20, 1987; and a continuation-in-part of Ser. No. 06/798,763, filed Nov. 15, 1985, now abandoned.

This invention relates to a transition metal containing supported catalyst component useful in combination with a cocatalyst for the polymerization and copolymerization of olefins and particularly useful for the polymerization of ethylene and copolymerization of ethylene with 1-olefins having 3 or more carbon atoms such as, for example, propylene, i-butene, 1-butene, 1-pentene, 1-hexene, 1-octene, cyclic olefins such as norbornene, and dienes such as butadiene, 1,7-octadiene and 1,4-hexadiene. The invention further relates to a heterogeneous catalyst system comprising the transition metal containing supported catalyst component and as a cocatalyst, the combination of an organometallic compound of a metal selected from Groups IA, IIA, IIB, and IIIA of the Periodic Table (66th Edition of Handbook of Chemistry of Physics, CRC Press, 1985–1986, CAS version) and an alumoxane. The invention further generally relates to a process for polymerization of ethylene alone or with other 1-olefins or diolefins in the presence of a catalyst system comprising the supported transition metal-containing catalyst component and an alumoxane.

DESCRIPTION OF THE PRIOR ART

Traditionally, ethylene and 1-olefins have been polymerized or copolymerized in the presence of hydrocarbon insoluble catalyst systems comprising a transition metal compound and an aluminum alkyl. More recently, active homogeneous catalyst systems comprising a bis(cyclopentadienyl)titanium dialkyl or a bis(cyclopentadienyl)-zirconium dialkyl, an aluminum trialkyl and water have been found to be useful for the polymerization of ethylene.

German Patent Application 2,608,863 discloses the use of a catalyst system for the polymerization of ethylene consisting of bis (cyclopentadienyl) titanium dialkyl, aluminum trialkyl and water.

German Patent Application 2,608,933 discloses an ethylene polymerization catalyst system consisting of zirconium metallocenes of the general formula (cyclopentadienyl)$_n$ZrY$_{4-n}$, wherein n stands for a number in the range of 1 to 4, Y for R, CH$_2$AlR$_2$, CH$_2$CH$_2$AlR$_2$ and CH$_2$CH(AlR$_2$)$_2$, wherein R stands for alkyl or metallo alkyl, and an aluminum trialkyl cocatalyst and water.

European Patent Application No. 0035242 discloses a process for preparing ethylene polymers and atactic propylene polymers in the presence of a halogen-free Ziegler catalyst system comprising (1) a cyclopentadienyl compound of the formula (cyclopentadienyl)-$_n$MeY$_{4-n}$ in which n is an integer from 1 to 4, Me is a transition metal, especially zirconium, and Y is either hydrogen, a C$_1$–C$_5$ alkyl or metallo alkyl group or a radical having the following general formula CH$_2$AlR$_2$, CH$_2$CH$_2$AlR$_2$ and CH$_2$CH(AlR$_2$)$_2$ in which R represents a C$_1$–C$_5$ alkyl or metallo alkyl group, and (2) an alumoxane.

Additional teachings of homogeneous catalyst systems comprising a metallocene and alumoxane are European Patent Application 0069951 of Kaminsky et al, and U.S. Pat. No. 4,404,344 issued Sep. 13, 1983 of Sinn et al.

In "Molecular Weight Distribution and Stereoregularity Of Polypropylenes Obtained With Ti(OC$_4$H$_9$)$_4$/Al(C$_2$H$_5$)$_3$ Catalyst System"; *Polymer*, Pg. 469–471, 1981, Vol. 22, April, Doi, et al disclose propylene polymerization with a catalyst which at about 41° C. obtains a soluble catalyst and insoluble catalyst fraction, one with "homogeneous catalytic centers" and the other with "heterogeneous catalytic centers". The polymerization at that temperature obtains polypropylene having a bimodal molecular weight distribution.

An advantage of the metallocene-alumoxane homogeneous catalyst system is the very high activity obtained for ethylene polymerization. Nevertheless, the catalysts suffer from a disadvantage, that is, the ratio of alumoxane to metallocene is high, for example, in the order of 1,000 to 1 or greater. Such voluminous amounts of alumoxane would require extensive treatment of polymer product obtained in order to remove the undesirable aluminum. Another disadvantage of the homogeneous catalyst system is that the polymer product produced therefrom manifests small particle size and low bulk density.

In copending application U.S. Ser. No. 501,740 filed Jun. 6, 1983, now U.S. Pat. No. 4,530,914 a homogeneous catalyst system comprising two different metallocenes for use in producing polyolefins having a broad molecular weight distribution and/or multi-modal molecular weight distribution is described.

In copending application U.S. Ser. No. 697,308, filed Feb. 1, 1985, now U.S. Pat. No. 4,937,299 there is described a homogeneous catalyst system comprising two or more metallocenes, each having different reactivity ratios, for use in producing reactor blends, i.e., blends of two or more polymers having a varied compositional distribution produced simultaneously in one reactor. Other teachings are found in copending applications 501,588 filed May 27, 1983 now U.S. Pat. No. 4,522,982 and 728,111 filed Apr. 29, 1985.

James C. W. Chien, in "Reduction of Ti(IV) Alkyls in Cab-O-Sils Surfaces", Journal. of Catalysis 23, 71(1971); Dag Slotfeldt-Ellingsene et al. in "Heterogenization of Homogeneous Catalysts", Journal. Molecular Catalysis, 9, 423 (1980) disclose a supported titanocene in combination with alkyl aluminum halides as poor catalysts for olefin polymerization.

In copending application U.S. Ser. No. 747,616 filed Jun. 21, 1985 now abandoned a heterogeneous catalyst system comprising a supported metallocene and an alumoxane cocatalyst is disclosed.

It would be highly desirable to provide a metallocene based catalyst which is commercially useful for the polymerization of olefins wherein the aluminum to transition metal ratio is reduced compared with the known homogeneous systems, to provide a polymerization catalyst system which produces polymer product having improved particle size and bulk density, and to provide a catalyst system which evidences improved comonomer incorporation in the production of, for example, linear low density polyethylene (LLDPE). It is particularly desirable to provide a catalyst system capable of producing polymers having a varied range of molecular weight distributions and/or compositional distributions.

SUMMARY OF THE INVENTION

In accordance with the present invention, a catalyst system comprising (i) a metallocene and a non-metallocene transition metal compound (i.e. a transition metal compound not containing the cyclopentadienyl ring) supported catalyst component and (ii) a combination of an organometallic compound of a metal of Groups IA, IIA, IIB and IIIA of the Periodic Table and an alumoxane cocatalyst is provided for olefin polymerization, and particularly for the production of linear low, medium and high density polyethylenes and copolymers of ethylene with alpha-olefins having 3 or more carbon atoms ($C_3$–$C_{18}$), cyclic olefins, and/or diolefins having up to 18 carbon atoms.

The supported catalyst component provided in accordance with one embodiment of this invention, comprises the product obtained by contacting at least one metallocene and at least one non-cyclopentadienyl transition metal compound and a support material thereby providing a supported (multi)metallocene-non-metallocene transition metal compound olefin polymerization catalyst component.

In accordance with another embodiment of the invention, a catalyst system comprising a supported (multi) metallocene-noncyclopentadienyl transition metal compound and an organometallic compound alumoxane is provided which will polymerize olefins at commercially respectable rates without an objectionable excess of alumoxane as required in the homogenous system.

In yet another embodiment of this invention there is provided a process for the polymerization of ethylene and other olefins, and particularly homopolymers of ethylene and copolymers of ethylene and alpha-olefins and/or diolefins in the presence of the new catalyst system. The process, by means of the catalyst, provides the capability of producing polymers having a varied range of molecular weight distributions, i.e., from narrow molecular weight distribution to a broad molecular weight distribution and/or multi-modal molecular weight distribution. The process also provides the capability of producing reactor blends of polyethylene with polyethylene copolymers of selected composition.

The metallocenes employed in the production of the supported catalyst component are organometallic coordination compounds which are cyclopentadienyl derivatives of a Group IVB and VB metal of the Periodic Table and include mono, di and tricyclopentadienyls and their derivatives of the transition metals. Particularly desirable are the metallocenes of Group IVB metals such as titanium and zirconium.

The transition metal compounds employed in the production of the supported catalyst component are coordination compounds of a Group IVB, VB, or VIB metal, excluding cyclopentadienyl derivatives, but including the halide, alkoxide, oxyhalide, and hydride derivatives of the transition metals. Particularly desirable are the derivatives of Group IVB and VB metals such as titanium, zirconium, and vanadium.

The alumoxanes employed as the one component of the cocatalyst system are themselves the reaction products of an aluminum trialkyl with water.

The alumoxanes are well known in the art and comprise oligomeric, linear and/or cyclic alkyl alumoxanes represented by the formulae:

$$R-(Al-O)_n-AlR_2 \text{ for oligomeric, linear alumoxanes, and} \quad (I)$$
$$\phantom{xxxxx}R$$

$$(-Al-O-)_m \text{ for oligomeric, cyclic alumoxanes,} \quad (II)$$
$$\phantom{x}R$$

wherein n is 1–40, preferably 1–20 and m is 3–40, preferably 3–20 and R is a $C_1$–$C_8$ alkyl group and preferably methyl. Generally, in the preparation of alumoxanes from, for example, trimethylaluminum and water, a mixture of linear and cyclic compounds is obtained.

The alumoxanes can be prepared in a variety of ways. Preferably, they are prepared by contacting water with a solution of aluminum trialkyl, such as, for example, trimethylaluminum, in a suitable organic solvent such as benzene or an aliphatic hydrocarbon. For example, the aluminum alkyl is treated with water in the form of a moist solvent. In a preferred method, the aluminum alkyl, such as trimethylaluminum, can be desirably contacted with a hydrated salt such as hydrated ferrous sulfate. The method comprises treating a dilute solution of trimethylaluminum in, for example, toluene with ferrous sulfate heptahydrate.

PREFERRED EMBODIMENTS

Briefly, the supported (multi) transition metal containing catalyst component of the present invention is obtained by contacting at least one metallocene and at least one non-cyclopentadienyl transition metal compound (hereinafter "transition metal compound") with a solid porous support material. The supported product is employed as the transition metal-containing catalyst component for the polymerization of olefins.

Typically, the support can be any solid, particularly porous supports such as talc or inorganic oxides, or resinous support materials such as a polyolefin. Preferably, the support material is an inorganic oxide in finely divided form.

Suitable inorganic oxide materials which are desirably employed in accordance with this invention include Group IIA, IIIA, IVA or IVB metal oxides such as silica, alumina, and silica-alumina and mixtures thereof. Other inorganic oxides that may be employed either alone or in combination with the silica, alumina or silica-alumina are magnesia, titania, zirconia, and the like. Other suitable support materials, however, can be employed, for example, finely divided polyolefins such as finely divided polyethylene.

The metal oxides generally contain acidic surface hydroxyl groups which will react with the metallocene added to the reaction slurry. Prior to use, the inorganic oxide support is dehydrated, i.e., subjected to a thermal treatment in order to remove water and reduce the concentration of the surface hydroxyl groups. The treatment is carried out in vacuum or while purging with a dry inert gas such as nitrogen at a temperature of about 100° C. to about 1000° C., and preferably, from about 300° C. to about 800° C. Pressure considerations are not critical. The duration of the thermal treatment can be from about 1 to about 24 hours; however, shorter or longer times can be employed provided equilibrium is established with the surface hydroxyl groups.

Chemical dehydration as an alternative method of dehydration of the metal oxide support material can advantageously be employed. Chemical dehydration converts all water and hydroxyl groups on the oxide surface to inert species. Useful chemical agents are for example, SiCl₄; chlorosilanes, such as trimethylchlorosilane, dimethyaminotrimethylsilane and the like. The chemical dehydration is accomplished by slurrying the inorganic particulate material, such as, for example, silica in an inert low boiling hydrocarbon, such as, for example, hexane. During the chemical dehydration reaction, the silica should be maintained in a moisture and oxygen-free atmosphere. To the silica slurry is then added a low boiling inert hydrocarbon solution of the chemical dehydrating agent, such as, for example, dichlorodimethylsilane. The solution is added slowly to the slurry. The temperature ranges during chemical dehydration reaction can be from about 25° C. to about 120° C., however, higher and lower temperatures can be employed. Preferably, the temperature will be about 50° C. to about 70° C. The chemical dehydration procedure should be allowed to proceed until all the moisture is removed from the particulate support material, as indicated by cessation of gas evolution. Normally, the chemical dehydration reaction will be allowed to proceed from about 30 minutes to about 16 hours, preferably 1 to 5 hours. Upon completion of the chemical dehydration, the solid particulate material is filtered under a nitrogen atmosphere and washed one or more times with a dry, oxygen-free inert hydrocarbon solvent. The wash solvents, as well as the diluents employed to form the slurry and the solution of chemical dehydrating agent, can be any suitable inert hydrocarbon. Illustrative of such hydrocarbons are heptane, hexane, toluene, isopentane and the like.

The normally hydrocarbon soluble metallocene is converted to a heterogeneous supported catalyst by simply depositing said at least one metallocene on the support material.

Any of the conventional Ziegler-Natta transition metal compounds can be usefully employed as the transition metal component in preparing the supported catalyst component. Typically, the transition metal component is a compound of a Group IVB, VB, or VIB metal. The transition metal component is generally represented by the formulas:

$$TrX'_{4-q}(OR')_q, TrX'_{4-q}R_q^2, VOX'_3 \text{ and } VO(OR')_3.$$

Tr is a Group IVB, VB, or VIB metal, preferably a Group IVB or VB metal and preferably titanium, vanadium or zirconium, q is 0 or a number equal to or less than 4, X' is a halogen and R₁ is an alkyl group, aryl group or cycloalkyl group having from 1 to 20 carbon atoms, and R² is an alkyl group, aryl group, aralkyl group, substituted aralkyl group, and the like. The aryl, aralkyls and substituted aralkyls contain from 1 to 20 carbon atoms preferably 1 to 10 carbon atoms. When the transition metal compound contains a hydrocarbyl group, R², being an alkyl, cycloalkyl, aryl, or aralkyl group, the hydrocarbyl group will preferably not contain an H atom in the position beta to the metalcarbon bond. Illustrative, but non-limiting examples of alkyl groups are methyl, neo-pentyl, 2,2-dimethylbutyl, 2,2-dimethylhexyl; aryl groups such as phenyl, naphthyl; aralkyl groups such as benzyl; cycloalkyl groups such as 1-norbornyl. Mixtures of these transition metal compounds can be employed if desired.

Illustrative examples of the transition metal compounds include TiCl₄, TiBr₄, Ti(OC₂H₅)₃Cl, Ti(OC₂H₅)Cl₃, Ti(OC₄H₉)₃Cl, Ti(OC₃H₇)₂Cl₂, Ti(OC₆H₁₃)₂Cl₂, Ti(OC₈H₁₇)₂Br₂, and Ti(OC₁₂H₂₅)Cl₃. Illustrative examples of vanadium compounds include VCl₄, VOCl₃, VO(OC₂H₅)₃, and VO(OC₄H₉)₃. Illustrative examples of zirconium compounds include ZrCl₄, ZrCl₃(OC₂H₅), ZrCl₂(OC₂H₅)₂, ZrCl(OC₂H₅)₃, Zr(OC₂H₅)₄, ZrCl₃(OC₄H₉), ZrCl₂(OC₄H₉)₂, and ZrCl(OC₄H₉)₃.

As indicated above, mixtures of the transition metal compounds may be usefully employed, no restriction being imposed on the number of transition metal compounds which may be contacted with the support and one or more metallocenes. Any halogenide and alkoxide transition metal compound or mixtures thereof can be usefully employed. The previously named transition metal compounds are especially preferred with vanadium tetrachloride, vanadium oxychloride, and titanium tetrachloride being most preferred.

The present invention employs at least one metallocene compound in the formation of the supported catalyst. Metallocene, i.e. a cyclopentadienide, is a metal derivative of a cyclopentadiene. The metallocenes usefully employed in accordance with this invention contain at least one cyclopentadiene ring. The metal is selected from Group IVB, or VB metals, preferably titanium, zirconium, hafnium, and vanadium, and especially titanium and zirconium. The cyclopentadienyl ring can be unsubstituted or contain substituents such as, for example, hydrocarbyl substituents. The metallocene can contain one, two, or three cyclopentadienyl ring however two rings are preferred.

The metallocenes can be represented by the general formulas:

$$(Cp)_m MR_n X_q \qquad (I)$$

wherein Cp is a cyclopentadienyl ring, M is a Group IVB, or VB transition metal, R is a hydride or a hydrocarbyl group having from 1 to 20 carbon atoms, X is a halogen atom, m=1-3, n=0-3, q=0-3 and the sum of m+n+q is equal to the oxidation state of M.

$$(C_5R'_k)_g R''_s(C_5R'_k)MQ_{3-g} \text{ and} \qquad (II)$$

$$R''_s(C_5R'_k)_2 MQ' \qquad (III)$$

wherein $(C_5R'_k)$ is a cyclopentadienyl or substituted cyclopentadienyl, each R' is the same or different and is hydrogen or a hydrocarbyl radical such as alkyl, alkenyl, aryl, alkylaryl, or arylalkyl radical containing from 1 to 20 carbon atoms or two carbon atoms are joined together to form a C₄–C₆ ring, R'' is a C₁–C₄ alkylene radical, a dialkyl germanium or silicon, or a alkyl phosphine or amine radical bridging two $(C_5R'_k)$ rings, Q is a hydrocarbyl radical such as aryl, alkyl, alkenyl, alkylaryl, or aryl alkyl radical having from 1–20 carbon atoms, hydrocarboxy radical having from 1–20 carbon atoms or halogen and can be the same or different from each other, Q' is an alkylidiene radical having from 1 to about 20 carbon atoms, s is 0 or 1, g is 0, 1 or 2, s is 0 when g is 0, k is 4 when s is 1, and k is 5 when s is 0, and M is as defined above.

Exemplary hydrocarbyl radicals are methyl, ethyl, propyl, butyl, amyl, isoamyl, hexyl, isobutyl, heptyl, octyl, nonyl, decyl, cetyl, 2-ethylhexyl, phenyl and the like.

Exemplary halogen atoms include chlorine, bromine, fluorine and iodine and of these halogen atoms, chlorine is preferred.

Exemplary hydrocarboxy radicals are methoxy ethoxy, butoxy, amyloxy and the like.

Exemplary of the alkylidiene radicals is methylidene, ethylidene and propylidene.

Illustrative, but non-limiting examples of the metallocenes represented by formula I are dialkyl metallocenes such as bis(cyclopentadienyl)titanium dimethyl, bis(cyclopentadienyl)titanium diphenyl, bis(cyclopentadienyl)zirconium dimethyl, bis(cyclopentadienyl)-zirconium diphenyl, bis(cyclopentadienyl)hafnium dimethyl and diphenyl, bis(cyclopentadienyl)titanium dineopentyl, bis(cyclopentadienyl)zirconium dineopentyl, bis(cyclopentadienyl)titanium dibenzyl, bis(cyclopentadienyl)zirconium dibenzyl, bis(cyclopentadienyl)vanadium dimethyl; the mono alkyl metallocenes such as bis(cyclopentadienyl)titanium methyl chloride, bis(cyclopentadienyl)titanium ethyl chloride, bis(cyclopentadienyl)titanium phenyl chloride, bis(cyclopentadienyl)zirconium methyl chloride, bis(cyclopentadienyl)zirconium ethyl chloride, bis(cyclopentadienyl)zirconium phenyl chloride, bis(cyclopentadienyl)titanium methyl bromide, bis(cyclopentadienyl)titanium methyl iodide, bis(cyclopentadienyl)titanium ethyl bromide, bis(cyclopentadienyl)titanium ethyl iodide, bis(cyclopentadienyl)titanium phenyl bromide, bis(cyclopentadienyl)titanium phenyl iodide, bis(cyclopentadienyl)zirconium methyl bromide, bis(cyclopentadienyl)zirconium methyl iodide, bis(cyclopentadienyl)zirconium ethyl bromide, bis(cyclopentadienyl)zirconium ethyl iodide, bis(cyclopentadienyl)zirconium phenyl bromide, bis(cyclopentadienyl)zirconium phenyl iodide; the trialkyl metallocenes such as cyclopentadienyltitanium trimethyl, cyclopentadienyl zirconium triphenyl, and cyclopentadienyl zirconium trineopentyl, cyclopentadienylzirconium trimethyl, cyclopentadienylhafnium triphenyl, cyclopentadienylhafnium trineopentyl, and cyclopentadienylhafnium trimethyl.

Illustrative, but non-limiting examples of II and III metallocenes which can be usefully employed in accordance with this invention are monocyclopentadienyls titanocenes such as, pentamethylcyclopentadienyl titanium trichloride, pentaethylcyclopentadienyl titanium trichloride, bis(pentamethylcyclopentadienyl) titanium diphenyl, the carbene represented by the formula $Cp_2Ti=CH_2$ and derivatives of this reagent such as $Cp_2Ti=CH_2\bullet Al(CH_3)_3$, $(Cp_2TiCH_2)_2$, and

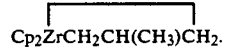
$Cp_2TiCH_2CH(CH_3)CH_2$, $Cp_2Ti-CH_2CH_2CH_2$;

substituted bis(Cp)Ti(IV) compounds such as bis(indenyl)titanium diphenyl or dichloride, bis(methylcyclopentadienyl)titanium diphenyl or dihalides; dialkyl, trialkyl, tetra-alkyl and pentaalkyl cyclopentadienyl titanium compounds such as bis(1,2-dimethylcyclopentadienyl)titanium diphenyl or dichloride, bis(1,2-diethylcyclopentadienyl)titanium diphenyl or dichloride and other dihalide complexes; silicon, phosphine, amine or carbon bridged cyclopentadiene complexes, such as dimethyl silyldicyclopentadienyl titanium diphenyl or dichloride, methyl phosphine dicyclopentadienyl titanium diphenyl or dichloride, methylenedicyclopentadienyl titanium diphenyl or dichloride and other dihalide complexes and the like.

Illustrative but non-limiting examples of the zirconocenes of Formula II and III which can be usefully employed in accordance with this invention are, pentamethylcyclopentadienyl zirconium trichloride, pentaethylcyclopentadienyl zirconium trichloride, the alkyl substituted cyclopentadlenes, such as bis(ethylcyclopentadienyl)zirconium dimethyl, bis(β-phenylpropylcyclopentadienyl)zirconium dimethyl, bis(methylcyclopentadienyl)zirconium dimethyl, bis(n-butylcyclopentadienyl)zirconium dimethyl, bis(cyclohexylmethylcyclopentadienyl)zirconium dimethyl, bis(n-octylcyclopentadienyl)- zirconium dimethyl, and haloalkyl and dihalide complexes of the above; dialkyl, trialkyl, tetra-alkyl, and pentaalkyl cyclopentadienes, such as bis(pentamethylcyclopentadienyl)zirconium diphenyl, bis(pentamethylcyclopentadienyl)zirconium dimethyl, bis(1,2-dimethylcyclopentadienyl)zirconium dimethyl and mono- and dihalide complexes of the above; silicon, phosphorus, and carbon bridged cyclopentadiene complexes such as dimethylsilyldicyclopentadienyl zirconium dimethyl, methyl halide or dihalide, and methylene dicyclopentadienyl zirconium dimethyl, methyl halide, or dihalide, carbenes represented by the formulae $Cp_2Zr=CH_2P(C_6H_5)_2CH_3$, and derivatives of these compounds such as

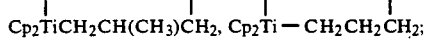
$Cp_2ZrCH_2CH(CH_3)CH_2$.

Bis(cyclopentadienyl)hafnium dichloride, bis(cyclopentadienyl)hafnium dimethyl, bis(cyclopentadienyl)vanadium dichloride and the like are illustrative of other metallocenes.

The treatment of the support material, as mentioned above, is conducted in an inert solvent. The same inert solvent or a different inert solvent can also employed to dissolve the metallocenes and, if desired and/or required, the transition metal component. Preferred solvents include mineral oils and the various hydrocarbons which are liquid at reaction temperatures and in which the metallocenes are soluble. Illustrative examples of useful solvents include the alkanes such as pentane, iso-pentane, hexane, heptane, octane and nonane; cycloalkanes such as cyclopentane and cyclohexane; and aromatics such as benzene, toluene, ethylbenzene and diethylbenzene. Preferably the support material is slurried in toluene and the metallocene(s) is dissolved in toluene prior to addition to the support material. The one or more transition metal component(s) can be contacted with the support material together with the metallocene(s) by dissolving or slurrying in the solvent, it can be contacted separately and simultaneously as a solution or neat with the support, or the transition metal component can be contacted prior to or subsequent to contacting the metallocene with the support material. The amount of solvent to be employed is not critical. Nevertheless, the amount employed should provide adequate heat transfer away from the catalyst components during reaction and permit good mixing.

The one or more metallocene(s) and the one or more transition metal component(s) can be added to the support material rapidly or slowly. The temperature maintained during the contact of the reactants can vary widely, such as, for example, from 0° to 100° C. Greater or lesser temperatures can also be employed. Preferably, the contacting of the at least one metallocene and the at least one transition metal compound with the silica is performed at room temperature. The reaction between the at least one metallocene and the support material is rapid, however, it is desirable that the at least one metallocene be contacted with the support material for about one hour up to eighteen hours or greater. Preferably, the reaction is maintained for about one hour. The reaction of the at least one metallocene with the support material is evidenced by elemental analysis of the support material for the transition metal contained in the metallocene(s).

At all times, the individual ingredients as well as the recovered catalyst component are protected from oxygen and moisture. Therefore, the contacting must be performed in an oxygen and moisture free atmosphere and recovered in an oxygen and moisture free atmosphere. Preferably, therefore, the contacting is performed in the presence of an inert dry gas such as, for example, nitrogen. The recovered solid catalyst is maintained in a nitrogen atmosphere.

Upon completion of the contacting of the at least one metallocene and the at least one transition metal component with the support, the solid catalyst component can be recovered by any well-known technique. For example, the solid material can be recovered from the liquid by vacuum evaporation, filtration or decantation. The solid is thereafter dried by any suitable drying technique, such as, drying under a stream of pure dry nitrogen or drying under vacuum.

The total amount of metallocene usefully employed in preparation of the solid supported catalyst component can vary over a wide range. The concentration of the metallocene deposited on the essentially dry support can be in the range of about 0.001 to about 5 mmoles/g of support, however, greater or lesser amounts can be usefully employed. Preferably, the metallocene concentration is in the range of 0.010 to 2 mmoles/g of support and especially 0.03 to 1 mmoles/g of support.

The molar ratio of the metallocene component to the transition metal component can vary over a wide range and in accordance with this invention is limited only by the breadth of the molecular weight distribution desired. The ratio can be in the range of about 100 to about 0.01 and preferably about 10 to about 0.1 moles metallocene component per mole of transition metal component.

It is highly desirable to have for many applications, such as extrusion and molding processes, polyethylenes which have a broad molecular weight distribution (BMWD) of the unimodal or the multimodal type. Such polyethylenes evidence excellent processability, i.e., they can be processed at a faster throughput rate with lower energy requirements and at the same time such polymers would evidence reduced melt flow perturbations. The polyethylenes can be obtained by using the supported catalyst of this invention comprising the at least one metallocene and the at least one transition metal component. In accordance with the invention, BMWD polyethylenes can be obtained by employing on one support metallocenes and transition metal components which will have different propagation and termination rate constants for ethylene polymerization. Such rate constants are readily determined by one of ordinary skill in the art.

The MWD of the polyethylenes can also readily be controlled by varying the molar ratios of the metallocene to transition metal component on the support. Conventional polymerization adjuvants such as hydrogen, can be employed to control the molecular weight of the polymer produced.

The present invention also provides a process for producing (co)polyolefin reactor blends comprising polyethylene and copolyethylene-alpha-olefins. The reactor blends are obtained directly during a single polymerization process, i.e., the blends of this invention are obtained in a single reactor by simultaneously polymerizing ethylene and copolymerizing ethylene with an alpha-olefin thereby eliminating expensive blending operations. The process of producing reactor blends in accordance with this invention can be employed in conjunction with other prior art blending techniques, for example the reactor blends produced in a first reactor can be subjected to further blending in a second stage by use of the series reactors.

In order to produce reactor blends the supported metallocene-transition metal component catalyst comprises metallocenes and transition metal compounds having different reactivity ratios.

The reactivity ratios of the metallocenes and transition metal components in general are obtained by methods well known such as, for example, as described in "Linear Method for Determining Monomer Reactivity Ratios in Copolymerization", M. Fineman and S. D. Ross, J. Polymer Science 5, 259 (1950) or "Copolymerization", F. R. Mayo and C. Walling, Chem. Rev. 46, 191 (1950) incorporated herein in its entirety by reference. For example, to determine reactivity ratios the most widely used copolymerization model is based on the following equations:

$$M_1^* + M_1 \xrightarrow{k_{11}} M_1^* \quad (1)$$

$$M_1^* + M_2 \xrightarrow{k_{12}} M_2^* \quad (2)$$

$$M_2^* + M_1 \xrightarrow{k_{21}} M_1^* \quad (3)$$

$$M_2^* + M_2 \xrightarrow{k_{22}} M_2^* \quad (4)$$

where $M_1$ refers to a monomer molecule which is arbitrarily designated i (where i=1, 2) and $M_i^*$ refers to a growing polymer chain to which monomer i has most recently attached.

The $k_{ij}$ values are the rate constants for the indicated reactions. In this case, $k_{11}$ represents the rate at which an ethylene unit inserts into a growing polymer chain in which the previously inserted monomer unit was also ethylene. The reactivity rates follow as: $r_1 = k_{11}/k_{12}$ and $r_2 = k_{22}/k_{21}$ wherein $k_{11}$, $k_{12}$, $k_{22}$ and $k_{21}$ are the rate constants for ethylene (1) or comonomer (2) addition to a catalyst site where the last polymerized monomer is ethylene ($k_{1x}$) or comonomer (2) ($k_{2x}$).

In Table I the ethylene-propylene reactivity ratios $r_1$ and $r_2$ are listed for several metallocenes and transition metal components.

It can be seen from Table I that if one desires a blend comprising HDPE/ethylene-propylene copolymer one would select $(Me_5Cp)_2ZrCl_2$ and $TiCl_4$ in ratios of about 1 to 10 to about 10 to 1 whereas if one desires a blend comprising LLDPE/ethylenepropylene one would select $(MeCp)_2ZrCl_2$ and $VCl_4$ in ratios of about 1 to 10 to about 10 to 1.

Desirably, the molar ratio of metallocene to transition metal component on the support will be about 100 to 1 to about 1 to 100, and preferably 10 to 1 to about 1 to 10. The specific metallocenes selected and their molar ratios are dependent upon the molecular composition desired for the component polymers and the overall composition desired for the blend. In general, the component catalyst used in a reactor blend catalyst mixture will each have r values which are different in order to produce final polymer compositions which comprise blends of two or more polymers.

TABLE I

| Catalyst | $r_1$ | $r_2$ |
|---|---|---|
| $Cp_2Ti=CH_2 Al(Me)_2Cl$ | 24 | 0.0085 |
| $Cp_2TiPh_2$ | 19.5 ± 1.5 | 0.015 ± .002 |
| $Me_2SiCp_2ZrCl_2$ | 24 ± 2 | 0.029 ± .007 |
| $Cp_2ZrCl_2$ | 48 ± 2 | 0.015 ± .003 |
| $(MeCp)_2ZrCl_2$ | 60 | |
| $(Me_5Cp)_2ZrCl_2$ | 250 ± 30 | .002 ± 0.001 |
| $[Cp_2ZrCl]_2O$ | 50 | 0.007 |
| $TiCl_3$ (a) | 15.7 | 0.110 |
| $TiCl_4$ (a) | 33.4 | 0.032 |
| $VCl_3$ (a) | 5.6 | 0.145 |
| $VCl_4$ (a) | 7.1 | 0.088 |
| $VO(OR)_xCl_{3-x}$ (a) | 17–28 | — |
| $ZrCl_4$ (a) | 61 | — |

(a) J. Boor, Ziegler-Natta Catalysts and Polymerizations, Academic Press, New York, 1979, P. 577.

The cocatalyst system employed in accordance with this invention comprises an alumoxane and an organic compound of a metal of Groups 1 through 3 of the Periodic Table.

Examples of the organic metal compounds employed in combination with the catalyst component are organic compounds of lithium, magnesium, calcium, zinc, and aluminum. Among other organic metal compounds just mentioned, organic aluminum compounds prove particularly desirable. The organic aluminum compounds usable herein are represented by the general formula $R_nAlX_{3-n}$ (wherein R denotes an alkyl group or an aryl group having from 1-18 carbon atoms, X denotes a halogen atom, an alkoxy group or a hydrogen atom, and n denotes a desired number in the range of 1 to 3). Particularly desirable examples of the organic aluminum compounds are alkyl aluminum compounds such as trialkyl aluminum, dialkyl aluminum monohalide, monoalkyl aluminum dihalide, alkyl aluminum sesquihalide, dialkyl aluminum monoalkoxide, and dialkyl aluminum monohydride, respectively having 1 to 18 carbon atoms, preferably 2 to 6 carbon atoms, and mixtures and complex compounds thereof. Illustrative examples of such organic aluminum compounds are trialkyl aluminums such as trimethyl aluminum, triethyl aluminum, tripropyl aluminum, triisobutyl aluminum, and trihexyl aluminum, dialkyl aluminum monohalides such as dimethyl aluminum chloride, diethyl aluminum chloride, diethyl aluminum bromide, diethyl aluminum iodide, and diisobutyl aluminum chloride, monoalkyl aluminum dihalides such as methyl aluminum dichloride, ethyl aluminum dichloride, methyl aluminum dibromide, ethyl aluminum dibromide, ethyl aluminum diiodide, and isobutyl aluminum dichloride, alkyl aluminum sesquihalides such as ethyl aluminum sesquichloride, dialkyl aluminum monoalkoxides such as dimethyl aluminum methoxide, diethyl aluminum ethoxide, diethyl aluminum phenoxide, dipropyl aluminum ethoxide, diisobutyl aluminum ethoxide, and diisobutyl aluminum phenoxide, and dialkyl aluminum hydrides such as dimethyl aluminum hydride, diethyl aluminum hydride, dipropyl aluminum hydride, and diisobutyl aluminum hydride. Among other organic aluminum compounds enumerated above, trialkyl aluminums, specifically trimethyl aluminum, triethyl aluminum, and triisobutyl aluminum, prove particularly desirable. The trialkyl aluminum can be used in combination with other organic aluminum compounds such as diethyl aluminum chloride, ethyl aluminum dichloride, ethyl aluminum sesquichloride, diethyl aluminum ethoxide, or diethyl aluminum hydride which are available commercially. These other organic aluminum compounds may be used in the form of a mixture or complex compound.

Further, an organic aluminum compound having two or more aluminum atoms linked through the medium of an oxygen atom or nitrogen atom is also usable. Concrete examples of this organic aluminum compound are

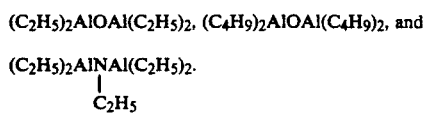

Examples of organic compounds of metals other than aluminum are diethyl magnesium, ethyl magnesium chloride, diethyl zinc and such compounds as $LiAl(C_2H_5)_4$ and $LiAl(C_7H_{15})_4$.

The ratio of alumoxane to the organometallic compound can vary over a wide range and is generally controlled only by the ratio of metallocene to transition metal component. The ratio of alumoxane to metallocene can vary widely and is generally in the range of about 1 to 100 moles of aluminum per mole of metallocene metal on the support. The ratio of organometallic compound to transition metal component will generally be in the range of about 1 to about 100 moles of aluminum per mole of transition metal component metal on the support. The alumoxane and the organometallic compound can be mixed in the desired ratio in a suitable hydrocarbon solvent and as isopentane, hexane, or toluene.

The inorganic oxide support used in the preparation of the catalyst may be any particulate oxide or mixed oxide as previously described which has been thermally or chemically dehydrated such that it is substantially free of adsorbed moisture.

The specific particle size, surface area, pore volume, and number of surface hydroxyl groups characteristic of the inorganic oxide are not critical to its utility in the practice of the invention. However, since such characteristics determine the amount of inorganic oxide to be employed in preparing the catalyst compositions, as well as affecting the properties of polymers formed with the aid of the catalyst compositions, these characteristics must frequently be taken into consideration in choosing an inorganic oxide for use in a particular aspect of the invention. For example, when the catalyst composition is to be used in a gas-phase polymerization process—a type of process in which it is known that the polymer particle size can be varied by varying the particle size of the support—the inorganic oxide used in preparing the catalyst composition should be one having a particle size that is suitable for the production of a polymer having the desired particle size. In general, optimum results are usually obtained by the use of inorganic oxides having an average particle size in the range of about 30 to 600 microns, preferably about 30 to 100 microns; a surface area of about 50 to 1,000 square meters per gram, preferably about 100 to 400 square meters per gram; and a pore volume of about 0.5 to 3.5 cc per gram; preferably about 0.5 to 2 cc per gram.

The polymerization may be conducted by a solution, slurry, or gas-phase technique, generally at a temperature in the range of about 0°-160° C. or ven higher, and under atmospheric, subatmospheric, or superatmospheric pressure conditions; and conventional polymerization adjuvants, such as hydrogen may be employed if desired. It is generally preferred to use the catalyst composition at a concentration such as to provide about 0.000001–0.005%, most preferably about 0.00001–0.0003%, by weight of transition metal based on the weight of monomer(s), in the polymerization of ethylene, alone or with one or more higher olefins.

A slurry polymerization process can utilize sub- or superatmospheric pressures and temperatures in the range of 40°–110° C. In a slurry polymerization, a suspension of solid, particulate polymer is formed in a liquid polymerization medium to which ethylene, alpha-olefin comonomer, hydrogen and catalyst are added. The liquid employed as the polymerization medium can be an alkane or cycloalkane, such as butane, pentane, hexane, or cyclohexane, or an aromatic hydrocarbon, such as toluene, ethylbenzene or xylene. The medium employed should be liquid under the conditions of the polymerization and relatively inert. Preferably, hexane or toluene is employed.

A gas-phase polymerization process utilizes superatmospheric pressure and temperatures in the range of about 50°–120° C. Gas-phase polymerization can be performed in a stirred or fluidized bed of catalyst and product particles in a pressure vessel adapted to permit the separation of product particles from unreacted gases. Thermostated ethylene, comonomer, hydrogen and an inert diluent gas such as nitrogen can be introduced or recirculated so as to maintain the particles at a temperature of 50°–120° C. Polymer product can be withdrawn continuously or semi-continuously at a rate such as to maintain a constant product inventory in the reactor. After polymerization and deactivation of the catalyst, the product polymer can be recovered by any suitable means. In commercial practice, the polymer product can be recovered directly from the gas phase reactor, freed of residual monomer with a nitrogen purge, and used without further deactivation or catalyst removal. The polymer obtained can be extruded into water and cut into pellets or other suitable comminuted shapes. Pigments, anti-oxidants and other additives, as is known in the art, may be added to the polymer.

The molecular weight of polymer product obtained in accordance with this invention can vary over a wide range, such as low as 500 up to 2,000,000 or higher and preferably 1,000 to about 500,000.

In order to further improve catalyst performance, surface modification of the support material may be desired. Surface modification is accomplished by specifically treating the support material such as silica, alumina or silica-alumina with an organometallic compound having hydrolytic character. More particularly, the surface modifying agents for the support materials comprise the organometallic compounds of the metals of Group IIA and IIIA of the Periodic Table. Most preferably the organometallic compounds are selected from mag-nesium and aluminum organometallics and especially from magnesium and aluminum alkyls or mixtures thereof represented by the formulas $R^1MgR^2$ and $R^1R^2AlR^3$ wherein each of $R^1$, $R^2$ and $R^3$ which may be the same or different are alkyl groups, aryl groups, cycloalkyl groups, aralkyl groups, alkoxide groups alkadienyl groups or alkenyl groups. The hydrocarbon groups $R^1$, $R^2$ and $R^3$ can contain between 1 and 20 carbon atoms and preferably from 1 to about 10 carbon atoms.

The surface modifying action is effected by adding the organometallic compound in a suitable solvent to a slurry of the support material. Contact of the organometallic compound in a suitable solvent and the support is maintained from about 30 to 180 minutes and preferably from 60 to 90 minutes at a temperature in the range of 20° to 100° C. The diluent employed in slurrying the support can be any of the solvents employed in solubilizing the organometallic compound and is preferably the same.

The amount of surface modifying agent employed in preparation of the surface modified support material can vary over a wide range. Generally the amount will be in the range of $1 \times 10^{-6}$ moles to about $2 \times 10^{-3}$ moles of modifying agent per gram of support material. However greater or lesser amounts can be employed.

Illustrative, but non-limiting examples of magnesium compounds which may be suitably employed as a surface modifying agent for the support materials in accordance with the invention are dialkyl magnesiums such as diethylmagnesium, dipropylmagnesiums, di-isopropylmagnesium, di-n-butylmagnesium, di-isobutyl-magnesium, diamylmagnesium, di-n-octylmagnesium, di-n-hexylmagnesium, di-n-decylmagnesium, and di-n-dodecylmagnesium; dicycloalkylmagnesiums, such as dicyclohexylmagnesium; diarylmagnesiums such as dibenzylmagnesium, ditolylmagnesium and dixylylmagnesium, alkylalkoxy magnesium such as ethyl magnesium ethoxide and the like.

Illustrative, but non-limiting examples of the aluminum compounds which may be suitably employed in accordance with the invention are trialkylaluminums such as trimethylaluminum, triethylaluminum, tripropylaluminum, tri-isobutylaluminum, tri-n-hexylaluminum, and tri-n-octylaluminum. Preferably, the organoaluminum compounds are trimethylaluminum, triisobutylaluminum and triethylaluminum.

Preferably the surface modifying agents are the organomagnesium compounds which will have from one to six carbon atoms and most preferably $R^1$ and $R^2$ are different. Illustrative examples of the preferred magnesium compounds are ethyl-n-propylmagnesium, ethyln-butylmagnesium, amyl-n-hexylmagnesium, b-butyl-sec-butylmagnesium, n-butyl-n-octylmagnesium and the like. Mixtures of hydrocarbylmagnesium compounds may be suitably employed such as, for example, di-n-butylmagnesium and ethyl-n-butylmagnesium.

The magnesium hydrocarbyl compounds are generally obtained from commercial sources as mixtures of the magnesium hydrocarbon compound with a minor amount of aluminum hydrocarbyl compound. A minor amount of aluminum hydrocarbyl is present in order to facilitate solubilization and/or reduce the viscosity of the organomagnesium compound in hydrocarbon solvent. The hydrocarbon solvent usefully employed for the organomagnesium compound can be any of the well known hydrocarbon liquids, for example, hexane, heptane, octane, decane, dodecane, or mixtures thereof, as well as aromatic hydrocarbons such as benzene, toluene, xylene, etc.

The organomagnesium complex with a minor amount of aluminum alkyl can be represented by the formula $(R^1MgR^2)_x(R^4{}_3Al)_y$ wherein $R^1$ and $R^2$ are defined as above, $R^4$ is defined as $R^1$ and $R^2$ and x is greater than 0. The ratio of y over (y+x) is from 0 to less than 1, preferably from 0 to about 0.7 and most desirably from about 0 to 0.1.

Illustrative examples of the organomagnesium-organoaluminum complexes are [(n-C$_4$H$_9$)(C$_2$H$_5$)Mg][(C$_2$H$_5$)$_3$Al]$_{0.02}$, [(n-C$_4$H$_9$)$_2$Mg][(C$_2$H$_5$)$_3$Al]$_{0.013}$, [(n-C$_4$H$_9$)$_2$Mg][(C$_2$H$_5$)$_3$Al]$_{2.0}$ and [(n-C$_6$H$_{13}$)$_2$Mg][(C$_2$H$_5$)$_3$Al]$_{0.01}$. A suitable magnesium-aluminum complex is MAGALA®, BEM manufactured by Texas Alkyls, Inc.

The hydrocarbon soluble organomagnesium materials and can be prepared by conventional methods. One such method involved, for example, the addition of an appropriate aluminum alkyl to a solid dialkylmagnesium in the presence of an inert hydrocarbon solvent. The organomagnesium-organoaluminum complexes are, for example, described in U.S. Pat. Nos. 3,737,393 and 4,004,071 which are incorporated herein by reference. However, any other suitable method for preparation of organometallic compound may be suitably employed.

Since, in accordance with this invention, one can produce high viscosity polymer product at a relatively high temperature, temperature does not constitute a limiting parameter as with the prior art homogeneous metallocene/alumoxane catalysts. The catalyst systems described herein, therefore, are suitable for the polymerization of olefins in solution, slurry or gas phase polymerizations and over a wide range of temperatures and pressures. For example, such temperatures may be in the range of about −60° C. to about 280° C. and especially in the range of about 0° C. to about 160° C. The pressures employed in the process of the present invention are those well known, for example, in the range of about 1 to 500 atmospheres, however, higher pressures can be employed.

The polydispersites (molecular weight distribution) expressed as Mw/Mn are typically from 2.5 to 100 or greater. The polymers can contain up to 1.0 chain end unsaturation per molecule.

The polymers produced by the process of this present invention are capable of being fabricated into a wide variety of articles, as is known for homopolymers of ethylene and copolymers of ethylene and higher alpha-olefins.

In a slurry phase polymerization, the alumoxane cocatalyst in the alumoxane/aluminum alkyl cocatalyst mixture is preferably methyl alumoxane and the aluminum alkyl cocatalyst in the mixture is preferably Al(CH$_3$)$_3$ or Al(C$_2$H$_5$)$_3$. The alumoxane and the aluminum alkyl cocatalyst are dissolved together in a suitable solvent, typically in an inert hydrocarbon solvent such as toluene, xylene, and the like in a molar concentration of about $5 \times 10^{-3}$M; however, greater or lesser amounts can be used.

The present invention is illustrated by the following examples.

EXAMPLES

In the Examples following, the alumoxane employed was prepared by adding 45.5 grams of ferrous sulfate heptahydrate in 4 equally spaced increments over a 2 hour period to a rapidly stirred 2 liter round-bottom flask containing 1 liter of a 10.0 wt. percent solution of trimethylaluminum (TMA) in hexane. The flask was maintained at 50° C. and under a nitrogen atmosphere. Methane produce was continuously vented. Upon completion of the addition of ferrous sulfate heptahydrate, the flask was continuously stirred and maintained at a temperature of 50° for 6 hours. The reaction mixture was cooled to room temperature and allowed to settle. The clear solution was separated from the solids by decantation. The aluminum containing catalyst prepared in accordance with this procedure contains 65 mole percent of aluminum present as methylalumoxane and 35 mole percent of aluminum present as trimethylaluminum.

Molecular weights were determined on a Water's Associates Model No. 150C GPC (Gel Permeation Chromatography). The measurements were obtained by dissolving polymer samples in hot trichlorobenzene and filtered. The GPC runs are performed at 145° C. in trichlorobenzene at 1.0 ml/min flow using styragel columns from Perkin Elmer, Inc. 300 microliters of a 3.1% solution (300 ml) in trichlorobenzene were injected and the samples were run in duplicate. The integration parameters were obtained with a Hewlett-Packard Data Module.

Melt index data for the polyethylene products were determined at 190° C. according to ASTM Method D 1238.

EXAMPLE 1

Catalyst A Preparation 10 grams of a high surface area (Davison 952) silica, dehydrated in a flow of dry nitrogen at 600° C. for 5 hours was slurried with 50 cc of dry toluene at 30° C. under nitrogen in a 250 cc round-bottom flask using a magnetic stirrer. A solution of 0.200 grams bis(cyclopentadienyl) zirconium dichloride and 0.450 grams TiCl$_4$ dissolved in 25 cc of toluene was added dropwise to the stirred silica slurry. Stirring was continued for 1 hour while maintaining the temperature at 30° C., at which time the toluene was decanted off and the solids recovered. The solid catalyst was washed by stirring and decantation with three 10 cc portions of toluene and was dried in vacuum for 4 hours at room temperature. Analysis of the supported catalyst indicated that it contained 1.1 weight percent titanium and 0.63 weight percent zirconium on the silica.

EXAMPLE 1

Gas-Phase Ethylene Polymerization

Polymerization was performed in the gas-phase in a 1-liter autoclave reactor equipped with a paddle stirrer, an external water jacket for temperature control, a septum inlet and a regulated supply of dry nitrogen, ethylene, hydrogen and 1-butene. The reactor, containing 40.0 grams of ground polystyrene (10 mesh) which was added to aid stirring in the gas-phase, was dried and degassed thoroughly at 85° C. 2.0 cc of a hexane solution of methyl alumoxane and trimethyl aluminum which was 0.40 molar in methyl alumoxane and 0.40 molar in trimethyl aluminum was injected through the septum inlet, into the vessel using a gas-tight syringe. The reactor contents were stirred at 120 rpm at 85° C. for 1 minute and 0 psig nitrogen pressure. 60.0 mg of Catalyst A were injected into the reactor and the reactor was pressured to 200 psig with ethylene. The polymerization was continued for 10 minutes while maintaining the reaction vessel at 85° C. and 200 psig by constant ethylene flow. The reaction was stopped by rapid cooling and venting. 8.7 grams of polyethylene were recovered. The polyethylene had a weight average molecular weight of 663,000, a number average molecular weight of 5,500, a molecular weight distribution of 121 and a density of 0.960 g/cc. Specific polymerization activity was calculated by dividing the yield of polymer by the total weight of transition metal contained in the catalyst by the time in hours and by the absolute monomer pressure in atmospheres. For example 1, the specific activity is calculated, $$\text{specific gravity} = \frac{8.7 \text{ grams}}{.00104 \text{ g Ti} + \text{Zr} \times .167 \text{ hr} \times 13.6}$$
$$= 3700 \text{ g/gm} \cdot \text{hr} \cdot \text{atm}$$

EXAMPLE 2

Polymerization

Employing Catalyst A, polymerization was performed identically as in Example 1 with the exception that 13.0 cc of 1-butene was injected after the trimethylaluminum/methylalumoxane solution but before the zirconocene.

12.2 grams of polyethylene was recovered. The polyethylene had a weight average molecular weight of 333,000, a number average molecular weight of 5,700, a molecular weight distribution of 58, and a density of 0.920 grams/cc. The specific activity was 5200 g/g M.hr.atm.

EXAMPLE 3

Polymerization

Polymerization was performed with Catalyst A identically as in Example 1 with the exception that 8.1 mmoles of hydrogen gas were injected after the trimethylaluminum/methylalumoxane solution, but prior to the zirconocene. 10.0 grams of polyethylene was recovered. The polyethylene had a weight average molecular weight of 516,000, a number average molecular weight of 4,100, a molecular weight distribution of 126, a density of 0.960 grams/cc. The specific activity was 4300 g/g M.hr.atm.

EXAMPLE 4

Catalyst B Preparation

Catalyst B was prepared identically as Catalyst A with the exception that 0.500 mg of di(n-butoxy)-titanium dichloride was substituted for the TiCl$_4$, and the zirconocene and titanium compound were dissolved in 10 cc of dry hexane. Analysis of the supported catalyst indicated that it contained 0.90 weight percent titanium and 0.63 weight percent zirconium.

Polymerization (Gas-Phase)

The polymerization was performed identically as in Example 3 with the exception that 50.0 milligrams of Catalyst B was substituted for Catalyst A. 1.4 grams of polyethylene was recovered which had a weight average molecular weight of 464,000—a number average molecular weight of 5,900, a molecular weight distribution of 79, and a density of 0.960 g/cc. The specific activity was 800 g/g M.hr.atm.

EXAMPLE 5

The polymerization was performed identically as in Example 2 with the exception that 50.0 milligrams of Catalyst B was substituted for Catalyst A. 4.3 grams of polyethylene was recovered which had a weight average molecular weight of 825,000, a number average molecular weight of 9,300, a molecular weight distribution of 88, and a density of 0.928 g/cc. The specific activity was 2,500 g/g M.hr.atm.

What is claimed is:

1. A process for the polymerization of ethylene and copolymerization of ethylene and alpha-olefins, cyclic olefins, or diolefins, said process comprising polymerizing in the presence of a catalyst system comprising:
   I. a cocatalyst comprising:
      (a) an alumoxane, and
      (b) an organoaluminum compound represented by the formula $R_nAlX_{3-n}$ wherein R represents an alkyl or aryl group having from 1–18 carbon atoms, X is a halogen atom, an alkoxy group or a hydrogen atom, and n is in the range of 1 to 3, and
   II. a supported catalyst component obtained by treating an inorganic oxide support with at least one metallocene and at least one non-metallocene transition metal compound.

2. A process for the polymerization of ethylene and copolymerization of ethylene and alpha-olefins, cyclic olefins, or diolefins as in claim 1 wherein the
   (a) metallocene is represented by the formulas:

$$(\text{cp})_m MR_n X_q \tag{I}$$

$$(C_5R'_k)_g R''_s (C_5R'_k) MQ_{3-g} \text{ and} \tag{II}$$

$$R''_s (C_5R'_k)_2 MQ' \tag{III}$$

wherein Cp is a cyclopentadienyl ring, M is a Group IVB or VB transition metal, X is a halogen, R is a hydride, a hydrocarbyl or hydrocarboxy group having from 1 to 20 carbon atoms, m=1–3, n=0–3, q=0–3 and the sum of m+n+q is sufficient to saturate M, $(C_5R'_k)$ is a cyclopentadienyl or a substituted cyclopentadienyl; each R' is the same or different and is hydrogen or a hydrocarbyl radical selected from alkyl, alkenyl aryl, alkylaryl or arylalkyl radicals containing from 1 to 20 carbon atoms, or two carbon atoms are joined together to form a $C_4$–$C_6$ ring, R'' is a $C_1$–$C_4$ alkylene radical, a dialkyl germanium or silicon or an alkyl phosphine or amine radical bridging two $(C_5R'_k)$ rings; Q is a hydrocarbyl radical selected from aryl, alkyl, alkenyl, alkylaryl, or arylalkyl radicals having from 1–20 carbon atoms, hydrocarboxy radical having from 1–20 carbon atoms or halogen and can be the same or different from each other, Q' is an alkylidiene radical having from 1 to about 20 carbon atoms; s is 0 or 1; g is 0, 1, or 2; s is 0 when g is 0; k is 4 when s is 1 and k is 5 when s is 0; and M is defined as above, and,
   (b) the non-metallocene transition compound metal is represented by the formulas: $TrX'_{4-q}(OR')_q$, $TrX'_{4-q}R^2_q$, $VOX'_3$ and $VO(OR)_3$ wherein Tr is a Group IVB or Group VB metal, Q is 0 or a number equal to or less than 4, X' is a halogen, $R^1$ is an alkyl group, aryl group, or cycloalkyl group having from 1 to 20 carbon atoms, and $R^2$ is an alkyl group, aryl group, aralkyl group, or substituted aralkyl group having from 1 to 20 carbon atoms.

3. A process for the polymerization of ethylene and copolymerization of ethylene and alpha-olefins, cyclic olefins, or diolefins as in claim 2 wherein the support is silica.

4. A process for the polymerization of ethylene and copolymerization of ethylene and alpha-olefins, cyclic olefins, or diolefins as in claim 2 wherein the metallocene is selected from titanium, zirconium, hafnium or vanadium metallocenes or mixtures thereof.

5. A process for the polymerization of ethylene and copolymerization of ethylene and alpha-olefins, cyclic olefins, or diolefins as in claim 4 wherein the metallocene is selected from titanium or zirconium metallocenes or mixtures thereof.

6. A process for the polymerization of ethylene and copolymerization of ethylene and alpha-olefins, cyclic olefins, or diolefins as in claim 2 wherein the non-metallocene transition metal compound is selected from $TiCl_4$, $TiBr_4$, $Ti(OC_4H_9)_2Cl_2$, $VCl_4$, $VOCl_3$, and $ZrCl_4$.

7. A process for the polymerization of ethylene and copolymerization of ethylene and alpha-olefins, cyclic olefins, or diolefins as in claim 2 wherein the at least one metallocene is selected from bis(cyclopentadienyl)zirconium dichloride, bis(cyclopentadienyl)zirconium methyl chloride, bis(cyclopentadienyl)zirconium dimethyl, bis(methylcyclopentadienyl)zirconium dichloride, bis(methylcyclopentadienyl)zirconium methyl chloride, bis(methylcyclopentadienyl)zirconium dimethyl, bis(pentamethylcyclopentadienyl)zirconium dichloride, bis(pentamethylcyclopentadienyl)zirconium methyl chloride, bis(pentamethylcyclopentadienyl)zirconium dimethyl, bis(n-butylcyclopentadienyl)zirconium dichloride, bis(n-butylcyclopentadienyl)zirconium methyl chloride, bis(n-butylcyclopentadienyl)zirconium dimethyl, bis(cyclopentadienyl)titanium diphenyl, bis(cyclopentadienyl)titanium dichloride, bis(cyclopentadienyl)titanium methyl chloride, bis(cyclopentadienyl)titanium dimethyl, bis(methylcyclopentadienyl)titanium diphenyl, bis(methylcyclopentadienyl)titanium dichloride, bis(methylcyclopentadienyl)titanium diphenyl, bis(methylcyclopentadienyl)titanium methyl chloride, bis(methylcyclopentadienyl)titanium dimethyl, bis(pentamethylcyclopentadienyl)titanium dichloride, bis(pentamethylcyclopentadienyl)titanium diphenyl, bis(pentamethylcyclopentadienyl)titanium methyl chloride, bis(pentamethylcyclopentadienyl)titanium dimethyl, bis(n-butylcyclopentadienyl)titanium diphenyl, bis(n-butylcyclopentadienyl)titanium dichloride and mixtures thereof.

8. A process for the polymerization of ethylene and copolymerization of ethylene and alpha-olefins, cyclic olefins, or diolefins as in claim 7 wherein the metallocene is selected from bis(methylcyclopentadienyl)zirconium dichloride, bis(n-butylcyclopentadienyl)zirconium dichloride, bis(pentamethylcyclopentadienyl)zirconium dichloride, bis(cyclopentadienyl)titanium diphenyl, and bis(methylcyclopentadienyl)titanium diphenyl.

9. A process for the polymerization of ethylene and copolymerization of ethylene and alpha-olefins, cyclic olefins, or diolefins as in claim 2 wherein the molar ratio of the metallocene to the nonmetallocene transition metal containing compound is in the range of 10 moles metallocene compound per mole of non-metallocene transition metal compound to about 0.1 moles metallocene compound per mole of non-metallocene transition metal compound.

10. A process for the polymerization of ethylene and copolymerization of ethylene and alpha-olefins, cyclic olefins, or diolefins as in claim 1 wherein the alumoxane to organometallic compound is in the range of 10 moles of alumoxane per mole of organometallic compound to 0.1 moles of alumoxane per mole of organometallic compound.

11. A process for the polymerization of ethylene and copolymers of ethylene and alpha-olefins, cyclic olefins, or diolefins as in claim 1 wherein the alumoxane is methyl alumoxane.

* * * * *